United States Patent
Zhao et al.

(10) Patent No.: US 8,542,748 B2
(45) Date of Patent: Sep. 24, 2013

(54) METHODS AND SYSTEMS FOR PARALLEL VIDEO ENCODING AND DECODING

(75) Inventors: Jie Zhao, Camas, WA (US); Christopher A. Segall, Camas, WA (US); Louis J. Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1047 days.

(21) Appl. No.: 12/058,301

(22) Filed: Mar. 28, 2008

(65) Prior Publication Data

US 2009/0245349 A1  Oct. 1, 2009

(51) Int. Cl.
*H04N 11/02* (2006.01)

(52) U.S. Cl.
USPC .................................... 375/240.26

(58) Field of Classification Search
USPC .................. 375/240–240.26; 382/232–234
See application file for complete search history.

(56) References Cited

U.S. PATENT DOCUMENTS

| | | | |
|---|---|---|---|
| 5,557,332 A | 9/1996 | Koyanagi et al. | |
| 5,809,176 A | 9/1998 | Yajima | |
| 6,351,570 B1 | 2/2002 | Kobayashi | |
| 6,404,817 B1 | 6/2002 | Saha et al. | |
| 7,061,410 B1 | 6/2006 | Pearson et al. | |
| 7,262,722 B1 | 8/2007 | Jahanghir et al. | |
| 7,289,673 B2 | 10/2007 | Lin et al. | |
| 7,305,036 B2 | 12/2007 | MacInnis et al. | |
| 7,408,488 B2 | 8/2008 | Sekiguchi et al. | |
| 7,460,041 B2 | 12/2008 | Yang et al. | |
| 7,480,335 B2 | 1/2009 | Payson | |
| 7,525,456 B2 * | 4/2009 | Watanabe | 341/51 |
| 7,586,924 B2 | 9/2009 | Wiegand | |
| 7,630,565 B2 * | 12/2009 | Linzer | 382/234 |
| 7,636,395 B2 | 12/2009 | Yongfang et al. | |
| 7,656,320 B2 | 2/2010 | Schneider | |
| 7,813,431 B2 | 10/2010 | MacInnis | |
| 7,843,997 B2 | 11/2010 | Hellman | |
| 7,925,099 B2 | 4/2011 | Ramirez et al. | |
| 7,937,397 B2 | 5/2011 | Pickens | |
| 2003/0189982 A1 | 10/2003 | MacInnis | |
| 2004/0066852 A1 | 4/2004 | MacInnis | |
| 2004/0228410 A1 * | 11/2004 | Ameres et al. | 375/240.18 |
| 2004/0258162 A1 | 12/2004 | Gordon et al. | |
| 2004/0268329 A1 | 12/2004 | Prakasam | |
| 2005/0074176 A1 | 4/2005 | Marpe et al. | |
| 2005/0123207 A1 | 6/2005 | Marpe et al. | |
| 2006/0013318 A1 | 1/2006 | Webb et al. | |

(Continued)

FOREIGN PATENT DOCUMENTS

| | | |
|---|---|---|
| JP | 2006-014113 A | 1/2006 |
| JP | 2007-201938 A | 8/2007 |

(Continued)

OTHER PUBLICATIONS

Tol, Mapping of H.264 decoding on a multiprocessor architecture, Proceedings of SPIE, pp. 707-718, May 2003.*

(Continued)

*Primary Examiner* — Dmitry H Levitan
(74) *Attorney, Agent, or Firm* — Kristine Elizabeth Matthews; David C. Ripma

(57) ABSTRACT

Aspects of the present invention are related to systems and methods for parallel video encoding and decoding.

24 Claims, 9 Drawing Sheets

(56) References Cited

U.S. PATENT DOCUMENTS

| | | | |
|---|---|---|---|
| 2006/0126744 | A1 | 6/2006 | Peng et al. |
| 2006/0176953 | A1 | 8/2006 | Mohsenian |
| 2006/0233254 | A1 | 10/2006 | Lee et al. |
| 2007/0009047 | A1* | 1/2007 | Shim et al. ............... 375/240.26 |
| 2007/0133678 | A1 | 6/2007 | Sakai |
| 2007/0183491 | A1 | 8/2007 | Pearson et al. |
| 2007/0230567 | A1 | 10/2007 | Wang et al. |
| 2007/0242894 | A1 | 10/2007 | Kautzer et al. |
| 2007/0280345 | A1 | 12/2007 | Tu et al. |
| 2008/0013622 | A1* | 1/2008 | Bao et al. .................... 375/240.1 |
| 2008/0013633 | A1 | 1/2008 | Ye et al. |
| 2008/0056389 | A1 | 3/2008 | Chiang et al. |
| 2008/0063082 | A1 | 3/2008 | Watanabe et al. |
| 2008/0112489 | A1* | 5/2008 | Malladi et al. ........... 375/240.22 |
| 2008/0170615 | A1 | 7/2008 | Sekiguchi et al. |
| 2008/0181298 | A1 | 7/2008 | Shi et al. |
| 2008/0181304 | A1 | 7/2008 | Sekiguchi et al. |
| 2008/0187053 | A1* | 8/2008 | Zhao et al. ............... 375/240.25 |
| 2008/0199094 | A1 | 8/2008 | Choi et al. |
| 2008/0219349 | A1* | 9/2008 | Huang et al. ............. 375/240.15 |
| 2008/0240233 | A1 | 10/2008 | Au et al. |
| 2008/0262312 | A1 | 10/2008 | Carroll et al. |
| 2008/0310504 | A1 | 12/2008 | Ye et al. |
| 2008/0310512 | A1 | 12/2008 | Ye et al. |
| 2008/0310745 | A1 | 12/2008 | Ye et al. |
| 2009/0079602 | A1 | 3/2009 | Sze et al. |
| 2009/0175349 | A1 | 7/2009 | Ye et al. |
| 2009/0196343 | A1 | 8/2009 | Cho et al. |
| 2009/0196355 | A1 | 8/2009 | Kao et al. |
| 2009/0245349 | A1 | 10/2009 | Zhao et al. |
| 2009/0274382 | A1 | 11/2009 | Lin et al. |
| 2009/0279604 | A1 | 11/2009 | Chono et al. |
| 2010/0020866 | A1 | 1/2010 | Marpe et al. |
| 2010/0040138 | A1 | 2/2010 | Marpe et al. |
| 2010/0098155 | A1 | 4/2010 | Demircin et al. |
| 2010/0124286 | A1 | 5/2010 | Wang |
| 2010/0135416 | A1 | 6/2010 | Huang et al. |
| 2010/0142618 | A1 | 6/2010 | Pandit et al. |
| 2010/0172593 | A1 | 7/2010 | Chono |
| 2010/0238998 | A1 | 9/2010 | Nanbu et al. |
| 2011/0026604 | A1* | 2/2011 | Zhao et al. ............... 375/240.25 |
| 2011/0200115 | A1 | 8/2011 | Hayashi et al. |
| 2011/0206135 | A1 | 8/2011 | Drugeon et al. |

FOREIGN PATENT DOCUMENTS

| | | |
|---|---|---|
| JP | 2007-300455 | 11/2007 |
| JP | 2007-300455 A | 11/2007 |
| WO | WO 2006/051796 A1 | 5/2006 |
| WO | 2009/119888 A1 | 10/2009 |
| WO | 2010/095528 A1 | 8/2010 |

OTHER PUBLICATIONS

Erik B. Van Der Tol, Egbert G. T. Jaspers, Rob H. Gelderblom, "Mapping of H.264 decoding on a multiprocessor architecture," Image and Video Communication and Processing 2003 (Proceedings Volume). Editor(s) Bhaskaran Vasudev; T. Russell Hsing; Andrew G. Tescher; Touradj Ebrahimi, Proceedings of the SPIE, vol. 5022, pp. 707-718, May 7, 2003, USA.

ITU-T—Telecommunication Standardization Sector of ITU—Recommendation H.264—"Advanced video coding for generic audio visual services," Mar. 2010, 676 pages.

Joint Collaborative Team on Video Coding (JCT-VC) of ITU-T SG16 WP3 and ISO/IEC JTC1/SC29/WG11, "Test Model under Consideration," Document: JCTVC-A205, Jun. 6, 2010, 119 pages.

H264/MPEG-4 AVC [Joint Video Team of ITU-T VCEG and ISO/IEC MPEG, "H.264: Advanced video coding for generic audiovisual services," ITU-T Rec. H.264 and ISO/IEC 14496-10 (MPEG4—Part 10), Nov. 2007], 564 pages.

Jie Zhao and Andrew Segall, "New Results using Entropy Slices for Parallel Decoding," VCEG-AI32, ITU-Telecommunications Standardization Sector, Study Group 16, Question 6, Video Coding Experts Group, Jul. 16-18, 2008, pp. 1-9, Meeting Berlin, Germany.

Jie Zhao and Andrew Segall, "Parallel entropy decoding for high resolution video coding," Proc. of SPIE-IS&T Electronic Imaging, SPIE vol. 7257, Jan. 19, 2009, pp. 725706-1-725706-11.

Marpe, Schwarz and Wiegand, "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.

Extended European Search Report—Application No. 09725979.0-2223—Report dated Feb. 15, 2011, 3 pages.

International Search Report—International Application No. PCT/JP2010/068541—Date of mailing Dec. 7, 2010, 7 pages.

Gary Sullivan, Ajay Luthra, Thomas Wiegand, "Editors' Text for ISO/IEC 14496-10:2005 (AVC 3rd Edition)," ISO/IEC JTC1/SC29/WG11 MPEG05/N7081, Apr. 2005, Section 6.3, Section 7.3.3, Section 9.3, Busan, KR.

PCT/JP2009/056778—International Search Report and Written Opinion of the International Searching Authority—Date of Mailing Jun. 23, 2009, 7 pages.

PCT/JP2009/056778—International Search Report Corrected Version—Associated with Report Date of Mailing Jun. 23, 2009, 3 pages.

International Search Report—PCT/JP2011/066634—Mailing Date Oct. 25, 2011.

International Search Report—PCT/JP2011/066633—Mailing Date Oct. 25, 2011.

Andrew Segall et al., "A Highly Efficient and Highly Parallel System for Video Coding," Joint Collaborative Team on Video Coding (JCT-VC) of ITU-T SG16 WP3 and ISO/IEC JTC1/SC29/WG11 JCTVC-A105, Apr. 2010, pp. 25-28, Dresden, DE.

USPTO Non-Final Office Action—U.S. Appl. No. 12/837,337—Notification Date May 24, 2012.

USPTO Final Office Action—U.S. Appl. No. 12/579,236—Notification Date May 23, 2012.

USPTO Notice of Allowance—U.S. Appl. No. 12/895,676.

Japanese Office Action—Patent Application No. 2010-537070—Mailing Date: May 8, 2012.

Peng Zhang, Don Xie, and Wen Gao, "Variable-Bin-Rate CABAC Engine for H.264/AVC High Definition Real-Time Decoding," IEEE Transactions on Very Large Scale Integration (VLSI) Systems, Feb. 2009, pp. 417-426, vol. 17 No. 3, IEEE Educational Activities Department Piscataway, NJ, USA.

USPTO Office Action—U.S. Appl. No. 12/579,236—Mailing Date Jan. 12, 2012.

USPTO Office Action—U.S. Appl. No. 12/895,676—Mailing Date Dec. 21, 2011.

Chinese Office Action—Application No. 200980110928.2—Issuing Date: Apr. 18, 2012.

International Search Report—International Application No. PCT/JP2011/073156—Mailing Date Jan. 10, 2012.

Kiran Misra, Jie Zhao, and Andrew Segall, "Entropy Slices for Parallel Entropy Coding," Joint Collaborative Team on Video Coding (JCT-VC) of ITU-T SG16 WP3 and ISO/IEC JTC1/SC29/WG11, Jul. 2010, pp. 1-6, 2nd Meeting, Geneva, CH.

Martin Winken et al., "Description of video coding technology proposal by Fraunhofer HHI," Joint Collaborative Team on Video Coding (JCT-VC) of ITU-T SG16 WP3 and ISO/IEC JTC1/SC29/WG11, Apr. 2010, pp. 14-17, 1st Meeting, Dresden, DE.

International Search Report—International Patent Application No. PCT/JP2011/073150—Mailing Date Dec. 27, 2011.

Written Opinion of the International Searching Authority—International Patent Application No. PCT/JP2011/073150—Mailing Date Dec. 27, 2011.

USPTO Notice of Allowance—U.S. Appl. No. 12/895,676—Mailing Date Aug. 21, 2012.

USPTO Office Action—U.S. Appl. No. 12/836,507—Mailing Date Sep. 19, 2012.

Sharp, "Entropy slices for parallel entropy decoding," Telecommunication Standardization Sector, International Telecommunication Union, COM 16-C 405-E, pp. 1-9, Apr. 2008.

USPTO Office Action—U.S. Appl. No. 12/837,337—Notification Date Jan. 7, 2013.

ISO/IEC 14496-10, Information technology—Coding of audio-visual objects—Part 10: Advanced Video Coding, Second edition Oct. 1, 2004, pp. 1-280.

USPTO Office Action—U.S. Appl. No. 12/934,938—Notification Date Jan. 3, 2013.

European Patent Office—Office Action—Application No. 09 725 979.0—Dated May 14, 2013.

Russian Office Action—Application No. 2010142914—Dated Apr. 2, 2013.

USPTO Office Action—U.S. Appl. No. 12/579,236—Notification Date Jul. 2, 2013.

USPTO Office Action—U.S. Appl. No. 12/934,938—Notification Date May 14, 2013.

USPTO Office Action—U.S. Appl. No. 12/896,778—Notification Date May 22, 2013.

Puri et al., "Video coding using the H.264/MPEG-4 AVC compression standard," Signal Processing: Image Communication 19, 2004, pp. 793-849 (799-802, 838-839).

Chinese Office Action, Application No. 200980110928.2, Jun. 27, 2013.

* cited by examiner

METHODS AND SYSTEMS FOR PARALLEL VIDEO ENCODING AND DECODING

FIELD OF THE INVENTION

Embodiments of the present invention relate generally to video coding.

BACKGROUND

State-of-the-art video-coding methods and standards, for example H.264/MPEG-4 AVC (H.264/AVC), may provide higher coding efficiency than older methods and standards at the expense of higher complexity. Increasing quality requirements and resolution requirements on video coding methods and standards may also increase their complexity. Decoders that support parallel decoding may improve decoding speeds and reduce memory requirements. Additionally, advances in multi-core processors may make encoders and decoders that support parallel decoding desirable.

H.264/MPEG-4 AVC [Joint Video Team of ITU-T VCEG and ISO/IEC MPEG, "H.264: Advanced video coding for generic audiovisual services," ITU-T Rec. H.264 and ISO/IEC 14496-10 (MPEG4-Part 10), November 2007], which is hereby incorporated by reference herein in its entirety, is a video codec specification that uses macroblock prediction followed by residual coding to reduce temporal and spatial redundancy in a video sequence for compression efficiency.

SUMMARY

Some embodiments of the present invention comprise methods and systems for parallel entropy encoding and decoding of a video bitstream based on partitioning of data into entropy slices that may be entropy encoded and decoded independently.

In some embodiments of the present invention, a first portion and second portion of an input compressed-video bitstream may be entropy decoded independently. A block of samples of a video frame associated with the second portion of the input compressed-video bitstream may be reconstructed using decoded data from the first portion and the second portion. Thus, the reconstruction neighbor definition and the entropy decoding neighbor definition are not the same.

In some embodiments of the present invention, an encoder may partition input data into entropy slices. The encoder may entropy encode the entropy slices independently. The encoder may form a bitstream comprising entropy-slice headers each of which may indicate the location in the bitstream of the associated data for the entropy slice. In some embodiments of the present invention, a decoder may parse a received bitstream for entropy-slice headers, and the decoder may entropy decode a plurality of entropy slices according to a decoder-defined level of parallelism.

In some embodiments of the present invention, data may be multiplexed at a picture level to form entropy slices. In some embodiments, one, or more, entropy slices may correspond to prediction data, and one, or more, entropy slices may correspond to residual data. In alternative embodiments of the present invention, one, or more, entropy slices may correspond to each of a plurality of color planes.

In some embodiments of the present invention, a bitstream may be transcoded to comprise entropy slices. In these embodiments, a received bitstream may be entropy decoded, a plurality of entropy slices may be constructed, and each of the entropy slices may be independent encoded and written to a transcoded bitstream with an associated entropy-slice header.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

While any video coder/decoder (codec) that uses entropy encoding/decoding may be accommodated by embodiments of the present invention, exemplary embodiments of the present invention will be illustrated in relation to an H.264/AVC encoder and an H.264/AVC decoder. This is intended for illustration of embodiments of the present invention and not limitation.

State-of-the-art video-coding methods and standards, for example H.264/AVC, may provide higher coding efficiency than older methods and standards at the expense of higher complexity. Increasing quality requirements and resolution requirements on video coding methods and standards may also increase their complexity. Decoders that support parallel decoding may improve decoding speeds and reduce memory requirements. Additionally, advances in multi-core processors may make encoders and decoders that support parallel decoding desirable.

H.264/AVC, and many other video coding standards and methods, are based on a block-based hybrid video-coding approach, wherein the source-coding algorithm is a hybrid of inter-picture, also considered inter-frame, prediction, intra-picture, also considered intra-frame, prediction and transform coding of a prediction residual. Inter-frame prediction may exploit temporal redundancies, and intra-frame and transform coding of the prediction residual may exploit spatial redundancies.

Figure 1:
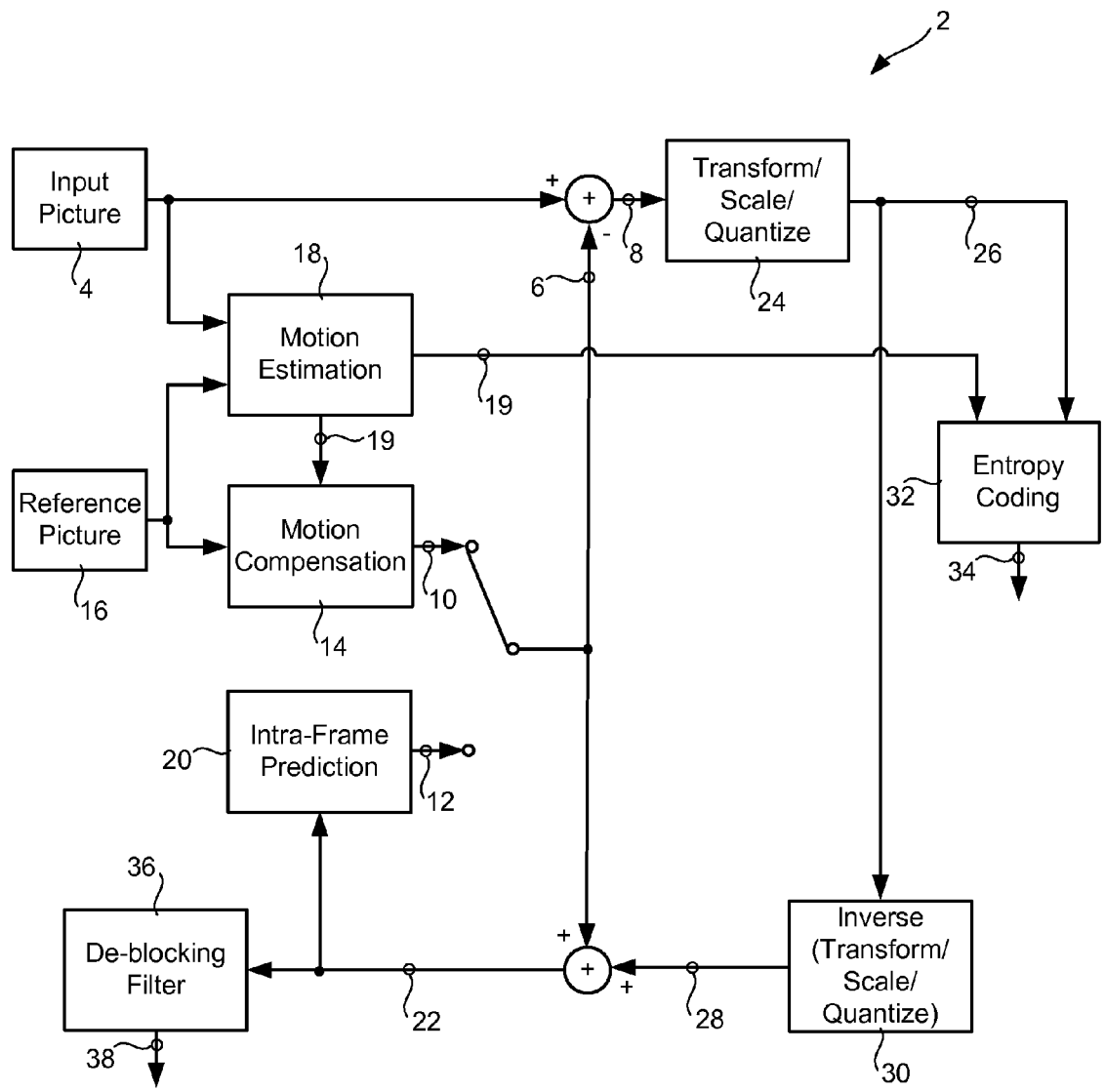
FIG. 1 is a picture showing an H.264/AVC video encoder (prior art)

FIG. 1 shows a block diagram of an exemplary H.264/AVC video encoder 2. An input picture 4, also considered a frame, may be presented for encoding. A predicted signal 6 and a residual signal 8 may be produced, wherein the predicted signal 6 may be based on either an inter-frame prediction 10 or an intra-frame prediction 12. The inter-frame prediction 10 may be determined by motion compensating 14 a stored, reference picture 16, also considered reference frame, using motion information 19 determined by a motion estimation 18 process between the input frame 4 and the reference frame 16. The intra-frame prediction 12 may be determined 20 using a decoded signal 22. The residual signal 8 may be determined by subtracting the input 4 from the prediction 6. The residual signal 8 is transformed, scaled and quantized 24, thereby producing quantized, transform coefficients 26. The decoded signal 22 may be generated by adding the predicted signal 6 to a signal 28 generated by inverse transforming, scaling and inverse quantizing 30 the quantized, transform coefficients 26. The motion information 19 and the quantized, transform coefficients 26 may be entropy coded 32 and written to the compressed-video bitstream 34. An output image region 38, for example a portion of the reference frame, may be generated at the encoder 2 by filtering 36 the reconstructed, pre-filtered signal 22.

Figure 2:
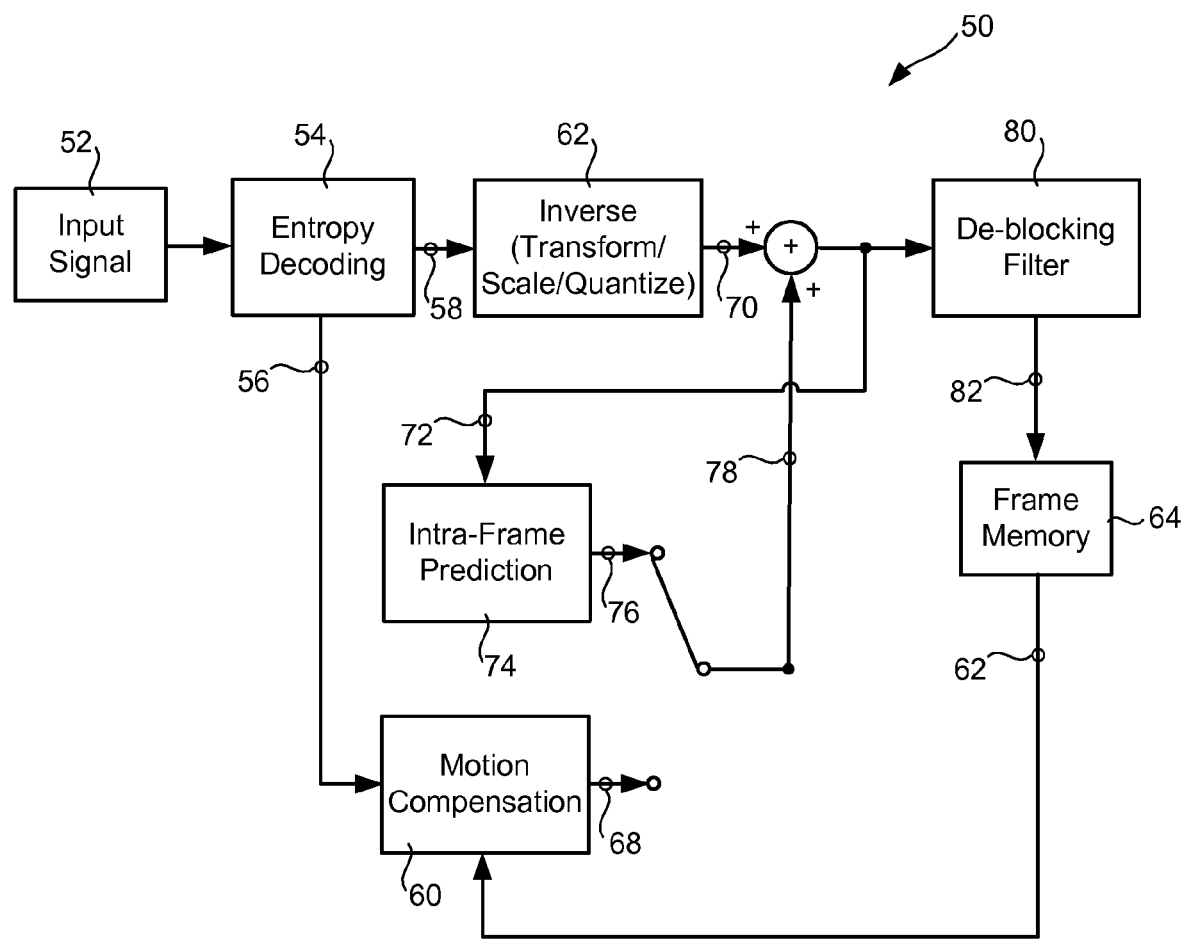
FIG. 2 is a picture showing an H.264/AVC video decoder (prior art)

FIG. 2 shows a block diagram of an exemplary H.264/AVC video decoder 50. An input signal 52, also considered a bitstream, may be presented for decoding. Received symbols may be entropy decoded 54, thereby producing motion information 56 and quantized, scaled, transform coefficients 58. The motion information 56 may be combined 60 with a portion of a reference frame 62 which may reside in frame memory 64, and an inter-frame prediction 68 may be generated. The quantized, scaled, transform coefficients 58 may be inverse quantized, scaled and inverse transformed 62, thereby producing a decoded residual signal 70. The residual signal 70 may be added to a prediction signal: either the inter-frame prediction signal 68 or an intra-frame prediction signal 76. The intra-frame prediction signal 76 may be predicted 74 from previously decoded information in the current frame 72. The combined signal 72 may be filtered 80 and the filtered signal 82 may be written to frame memory 64.

In H.264/AVC, an input picture is partitioned into fixed-size macroblocks, wherein each macroblock covers a rectangular picture area of 16×16 samples of the luma component and 8×8 samples of each of the two chroma components. The decoding process of the H.264/AVC standard is specified for processing units which are macroblocks. The entropy decoder 54 parses the syntax elements of the compressed-video bitstream 52 and de-multiplexes them. H.264/AVC specifies two alternative methods of entropy decoding: a low-complexity technique that is based on the usage of context-adaptively switched sets of variable length codes, referred to as CAVLC, and the computationally more demanding algorithm of context-based adaptively binary arithmetic coding, referred to as CABAC. In both entropy decoding methods, decoding of a current symbol may rely on previously, correctly decoded symbols and adaptively updated context models. In addition, different data information, for example, prediction data information, residual data information and different color planes, may be multiplexed together. De-multiplexing may not be done until elements are entropy decoded.

After entropy decoding, a macroblock may be reconstructed by obtaining: the residual signal through inverse quantization and the inverse transform, and the prediction signal, either the intra-frame prediction signal or the inter-frame prediction signal. Blocking distortion may be reduced by applying a de-blocking filter to every decoded macroblock. No processing may begin until the input signal is entropy decoded, thereby making entropy decoding a potential bottleneck in decoding.

Similarly, in codecs in which alternative prediction mechanisms may be allowed, for example, inter-layer prediction in H.264/AVC or inter-layer prediction in other scalable codecs, entropy decoding may be requisite prior to all processing at the decoder, thereby making entropy decoding a potential bottleneck.

In H.264/AVC, an input picture comprising a plurality of macroblocks may be partitioned into one or several slices. The values of the samples in the area of the picture that a slice represents may be correctly decoded without the use of data from other slices provided that the reference pictures used at the encoder and the decoder are identical. Therefore, entropy decoding and macroblock reconstruction for a slice do not depend on other slices. In particular, the entropy coding state is reset at the start of each slice. The data in other slices are marked as unavailable when defining neighborhood availability for both entropy decoding and reconstruction. In H.264/AVC, slices may be entropy decoded and reconstructed in parallel. No intra prediction and motion-vector prediction are allowed across the slice boundary. De-blocking filtering may use information across slice boundaries.

Figure 3:
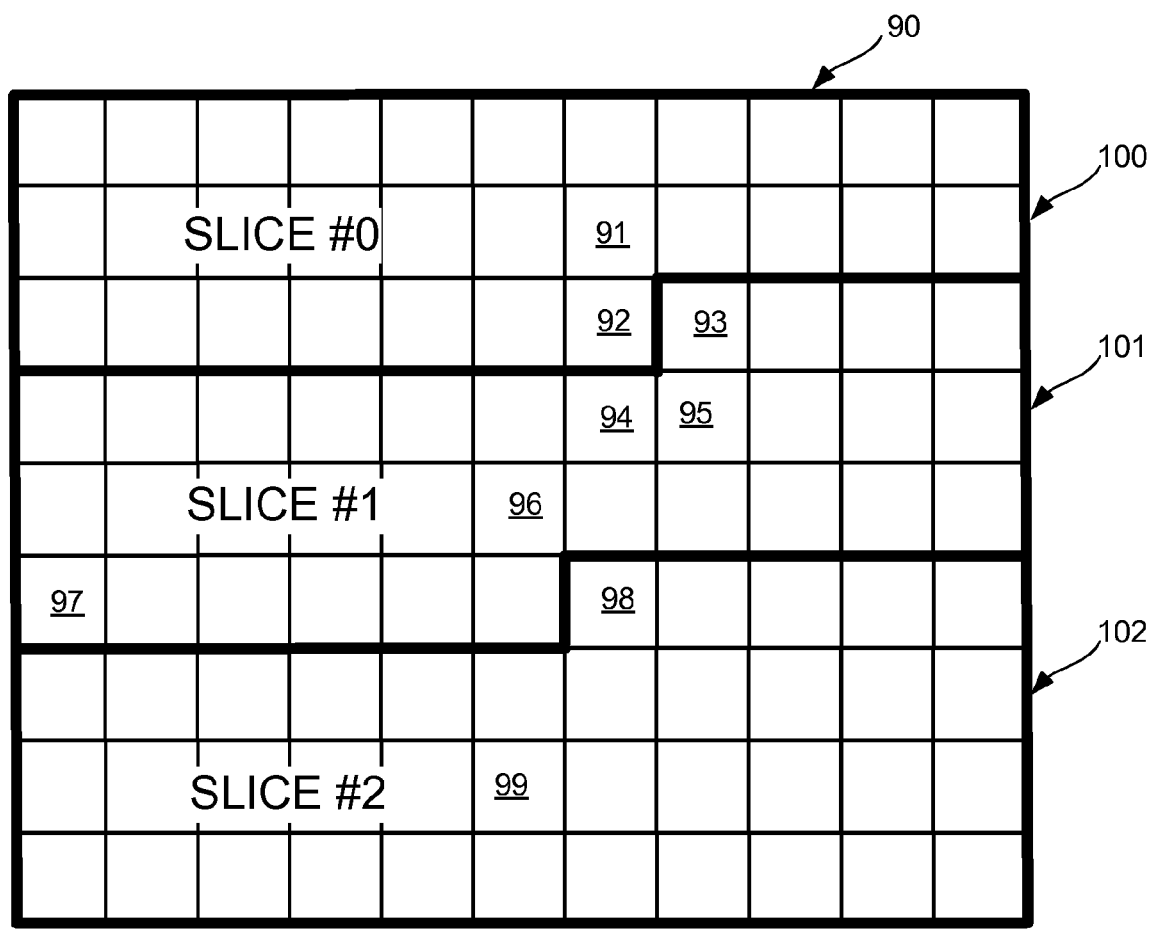
FIG. 3 is a picture showing an exemplary slice structure (prior art)

FIG. 3 shows an exemplary video picture 90 comprising eleven macroblocks in the horizontal direction and nine macroblocks in the vertical direction (nine exemplary macroblocks labeled 91-99). FIG. 3 shows three exemplary slices: a first slice denoted "SLICE #0" 100, a second slice denoted "SLICE #1" 101 and a third slice denoted "SLICE #2" 102. An H.264/AVC decoder may decode and reconstruct the three slices 100, 101, 102 in parallel. At the beginning of the decoding/reconstruction process for each slice, context models are initialized or reset and macroblocks in other slices are marked as unavailable for both entropy decoding and macroblock reconstruction. Thus, for a macroblock, for example, the macroblock labeled 93, in "SLICE #1," macroblocks (for example, macroblocks labeled 91 and 92) in "SLICE #0" may not be used for context model selection or reconstruction. Whereas, for a macroblock, for example, the macroblock labeled 95, in "SLICE #1," other macroblocks (for example, macroblocks labeled 93 and 94) in "SLICE #1" may be used for context model selection or reconstruction. Therefore, entropy decoding and macroblock reconstruction must proceed serially within a slice. Unless slices are defined using flexible macroblock ordering (FMO), macroblocks within a slice are processed in the order of a raster scan.

Flexible macroblock ordering defines a slice group to modify how a picture is partitioned into slices. The macroblocks in a slice group are defined by a macroblock-to-slice-group map, which is signaled by the content of the picture parameter set and additional information in the slice headers. The macroblock-to-slice-group map consists of a slice-group identification number for each macroblock in the picture. The slice-group identification number specifies to which slice group the associated macroblock belongs. Each slice group may be partitioned into one or more slices, wherein a slice is a sequence of macroblocks within the same slice group that is processed in the order of a raster scan within the set of macroblocks of a particular slice group. Entropy decoding and macroblock reconstruction must proceed serially within a slice.

Figure 4:
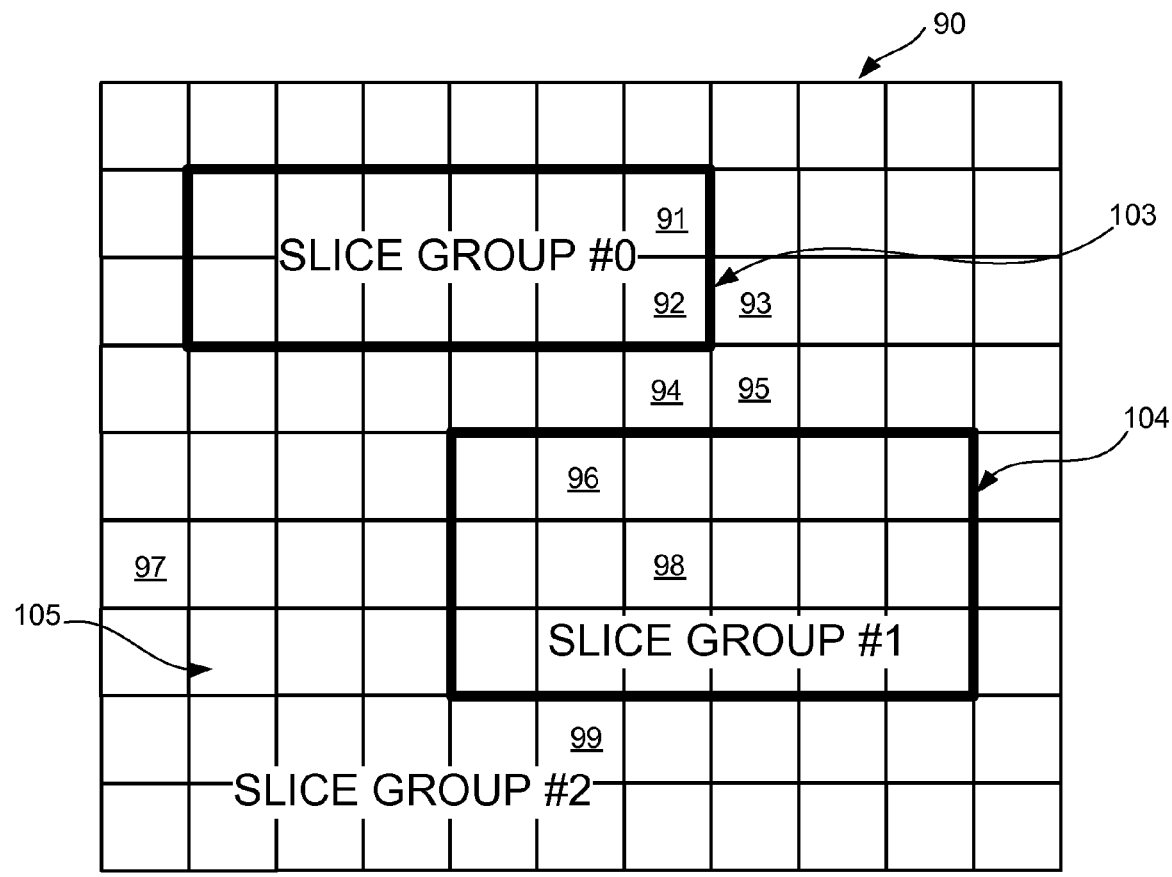
FIG. 4 is a picture showing an exemplary slice group structure (prior art)

FIG. 4 depicts an exemplary macroblock allocation into three slice groups: a first slice group denoted "SLICE GROUP #0" 103, a second slice group denoted "SLICE GROUP #1" 104 and a third slice group denoted "SLICE GROUP #2" 105. These slice groups 103, 104, 105 may be associated with two foreground regions and a background region, respectively, in the picture 90.

Some embodiments of the present invention may comprise partitioning a picture into one or more reconstruction slices, wherein a reconstruction slice may be self-contained in the respect that values of the samples in the area of the picture that the reconstruction slice represents may be correctly reconstructed without use of data from other reconstruction slices, provided that the references pictures used are identical at the encoder and the decoder. All reconstructed macroblocks within a reconstruction slice may be available in the neighborhood definition for reconstruction.

Some embodiments of the present invention may comprise partitioning a reconstruction slice into more than one entropy slice, wherein an entropy slice may be self-contained in the respect that symbol values in the area of the picture that the entropy slice represents may be correctly entropy decoded without the use of data from other entropy slices. In some embodiments of the present invention, the entropy coding state may be reset at the decoding start of each entropy slice. In some embodiments of the present invention, the data in other entropy slices may be marked as unavailable when defining neighborhood availability for entropy decoding. In some embodiments of the present invention, macroblocks in other entropy slices may not be used in a current block's context model selection. In some embodiments of the present invention, the context models may be updated only within an entropy slice. In these embodiments of the present invention, each entropy decoder associated with an entropy slice may maintain its own set of context models.

Some embodiments of the present invention may comprise CABAC encoding/decoding. The CABAC encoding process includes the following steps:

Binarization: A non-binary-valued symbol (for example, a transform coefficient, a motion vector, or other coding data) is converted into a binary code, also referred to as a bin string.

Binarization is followed, for each bin, also considered bit, of the binarized symbol by:

Context Model Selection: A context model is a probability model for one or more bins of the binarized symbol. The context model comprises, for each bin, the probability of the bin being a "1" or a "0." The model may be chosen for a selection of available models depending on the statistics of recently coded data symbols, usually based on the left and above neighboring symbols, if available.

Binary Arithmetic Coding: An arithmetic coder encodes each bin according to the selected probability model and is based on recursive interval subdivision.

Probability Update: The selected context model is updated based on the actual coded value.

In some embodiments of the present invention comprising CABAC encoding/decoding, at the decoding start of an entropy slice, all of the context models may be initialized or reset to predefined models.

Figure 5:
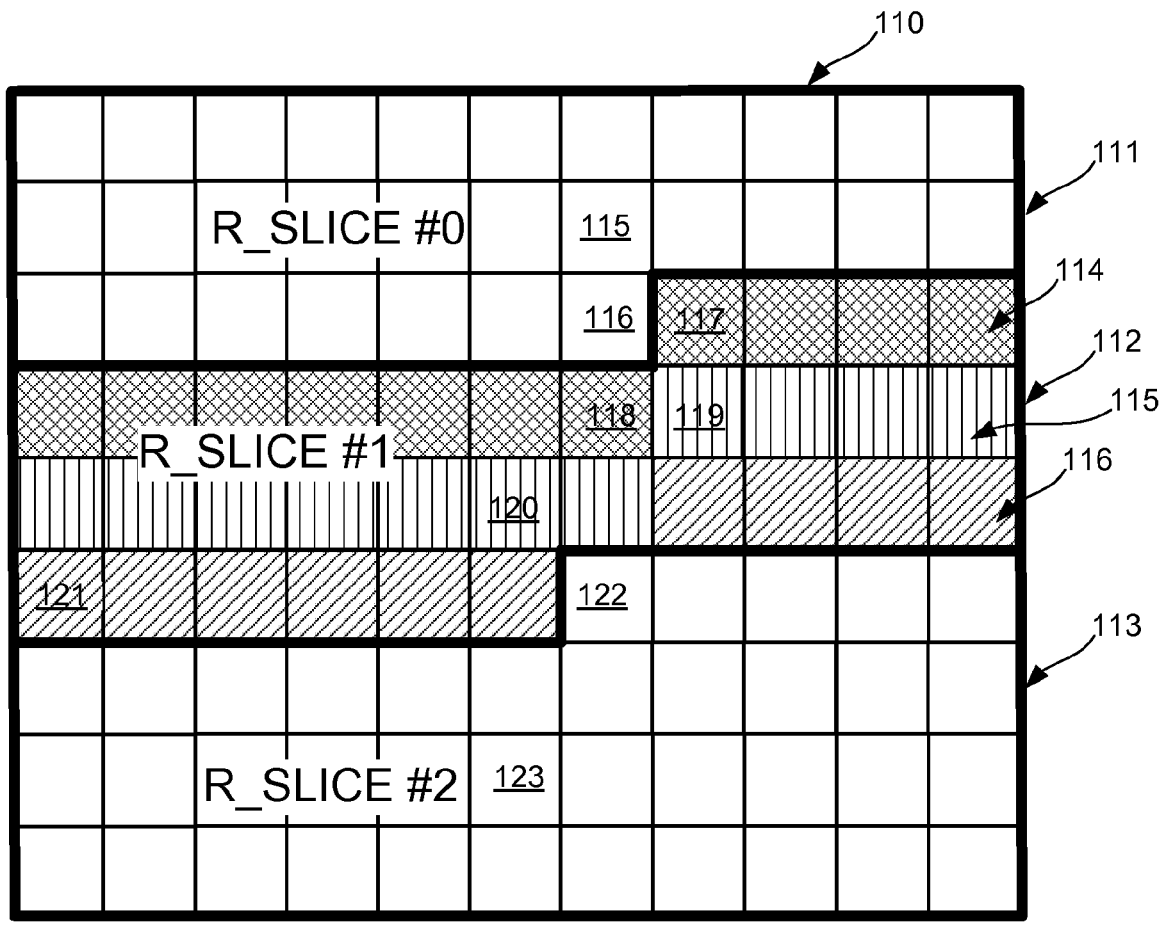
FIG. 5 is a picture showing an exemplary slice partition according to embodiments of the present invention, wherein a picture may be partitioned in at least one reconstruction slice and a reconstruction slice may be partitioned into more than one entropy slice.

Some embodiments of the present invention may be understood in relation to FIG. 5. FIG. 5 shows an exemplary video frame 110 comprising eleven macroblocks in the horizontal direction and nine macroblocks in the vertical direction (nine exemplary macroblocks labeled 115-123). FIG. 5 shows three exemplary reconstruction slices: a first reconstruction slice denoted "R_SLICE #0" 111, a second reconstruction slice denoted "R_SLICE #1" 112 and a third reconstruction slice denoted "R_SLICE #2" 113. FIG. 5 further shows a partitioning of the second reconstruction slice "R_SLICE #1" 112 into three entropy slices: a first entropy slice denoted "E_SLICE #0" shown in cross-hatch 114, a second entropy slice denoted "E_SLICE #1" shown in vertical-hatch 115 and a third entropy slice denoted "E_SLICE #2" shown in angle-hatch 116. Each entropy slice 114, 115, 116 may be entropy decoded in parallel.

In some embodiments of the present invention, only data from macroblocks within an entropy slice may be available for context model selection during entropy decoding of the entropy slice. All other macroblocks may be marked as unavailable. For this exemplary partitioning, macroblocks labeled 117 and 118 are unavailable for context model selection when decoding symbols corresponding to the area of macroblock labeled 119 because macroblocks labeled 117 and 118 are outside of the entropy slice containing macroblock 119. However, these macroblocks 117, 118 are available when macroblock 119 is reconstructed.

In some embodiments of the present invention, an encoder may determine whether or not to partition a reconstruction slice into entropy slices, and the encoder may signal the decision in the bitstream. In some embodiments of the present invention, the signal may comprise an entropy-slice flag, which may be denoted "entropy-slice-flag" in some embodiments of the present invention.

Figure 6:
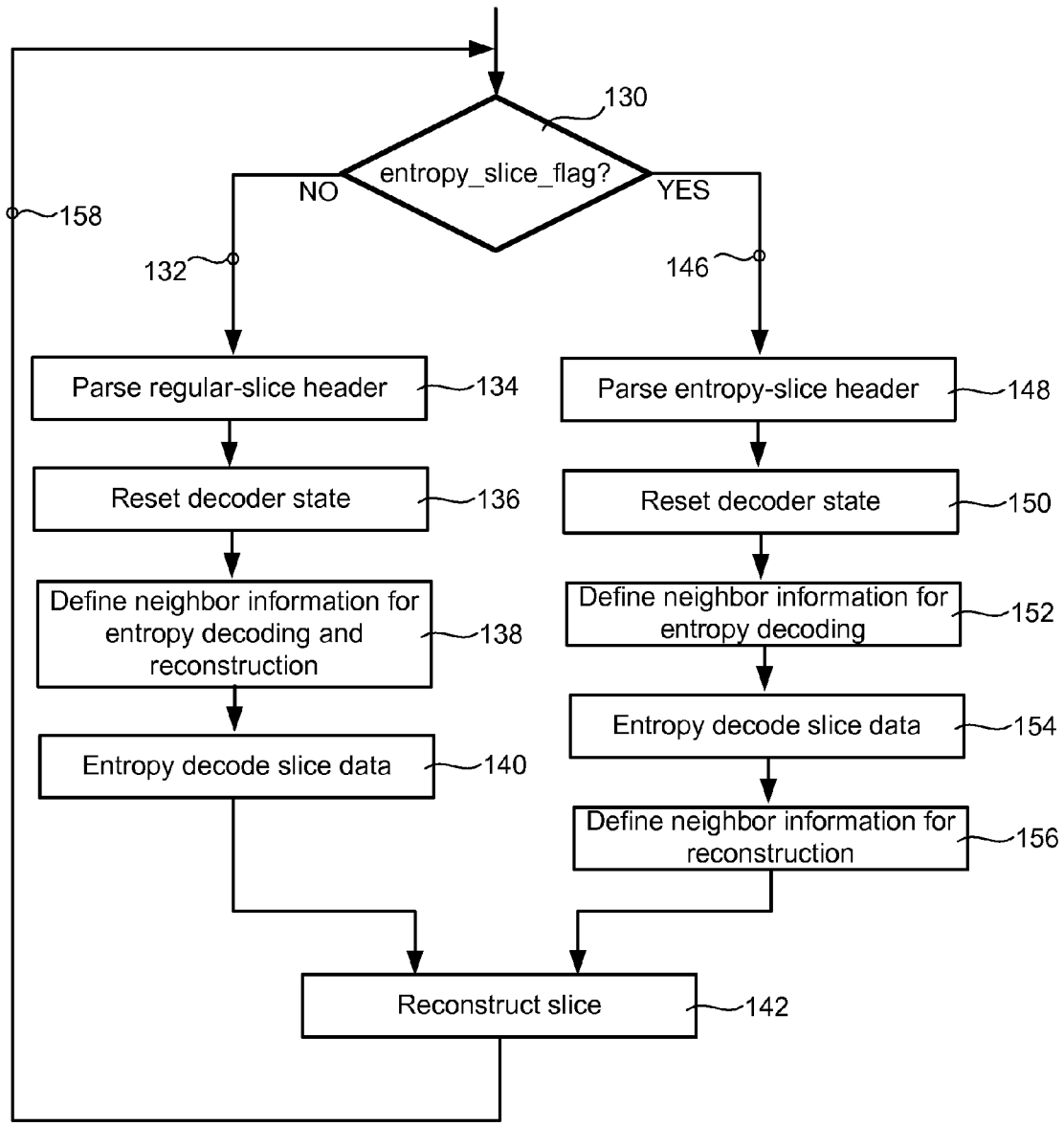
FIG. 6 is chart showing an exemplary embodiment of the present invention comprising an entropy slice.

Some decoder embodiments of the present invention may be described in relation to FIG. 6. In these embodiments, an entropy-slice flag may be examined 130, and if the entropy-slice flag indicates that there are no 132 entropy slices associated with a picture, or a reconstruction slice, then the header may be parsed 134 as a regular slice header. The entropy decoder state may be reset 136, and the neighbor information for the entropy decoding and the reconstruction may be defined 138. The slice data may then be entropy decoded 140, and the slice may be reconstructed 142. If the entropy-slice flag indicates there are 146 entropy slices associated with a picture, or a reconstruction slice, then the header may be parsed 148 as an entropy-slice header. The entropy decoder state may be reset 150, the neighbor information for entropy decoding may be defined 152 and the entropy-slice data may be entropy decoded 154. The neighbor information for reconstruction may then be defined 156, and the slice may be reconstructed 142. After slice reconstruction 142, the next slice, or picture, may be examined 158.

Figure 7:
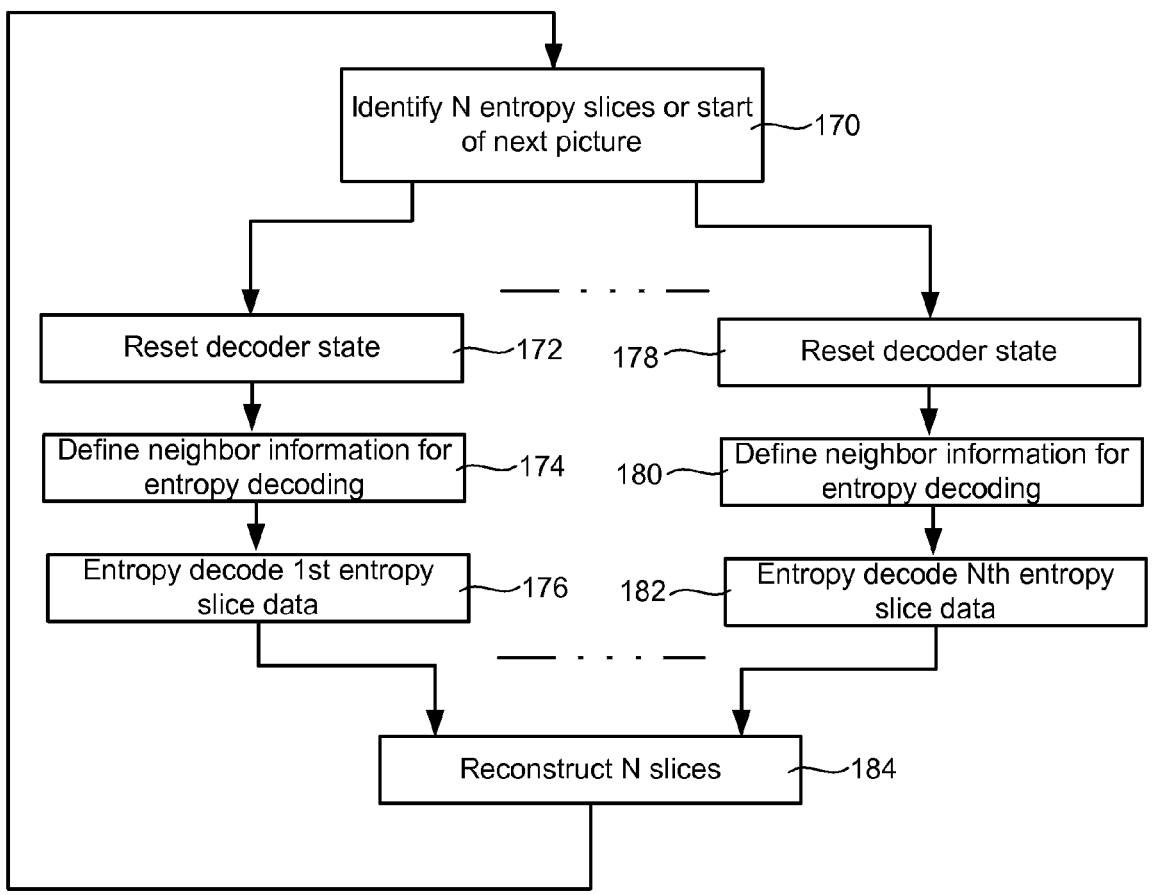
FIG. 7 is a chart showing an exemplary embodiment of the present invention comprising parallel entropy decoding of multiple entropy slices followed by slice reconstruction.

Some alternative decoder embodiments of the present invention may be described in relation to FIG. 7. In these embodiments, the decoder may be capable of parallel decoding and may define its own degree of parallelism, for example, consider a decoder comprising the capability of decoding N entropy slices in parallel. The decoder may identify 170 N entropy slices. In some embodiments of the present invention, if fewer than N entropy slices are available in the current picture, or reconstruction slice, the decoder may decode entropy slices from subsequent pictures, or reconstruction slices, if they are available. In alternative embodiments, the decoder may wait until the current picture, or reconstruction slice, is completely processed before decoding portions of a subsequent picture, or reconstruction slice. After identifying 170 up to N entropy slices, each of the identified entropy slices may be independently entropy decoded. A first entropy slice may be decoded 172-176. The decoding 172-176 of the first entropy slice may comprise resetting the decoder state 172. In some embodiments comprising CABAC entropy decoding, the CABAC state may be reset. The neighbor information for the entropy decoding of the first entropy slice may be defined 174, and the first entropy slice data may be decoded 176. For each of the up to N entropy slices, these steps may be performed (178-182 for the Nth entropy slice). In some embodiments of the present invention, the decoder may reconstruct 184 the entropy slices when all of the entropy slices are entropy decoded. In alternative embodiments of the present invention, the decoder may begin reconstruction 184 after one or more entropy slices are decoded.

In some embodiments of the present invention, when there are more than N entropy slices, a decode thread may begin entropy decoding a next entropy slice upon the completion of entropy decoding of an entropy slice. Thus when a thread finishes entropy decoding a low complexity entropy slice, the thread may commence decoding additional entropy slices without waiting for other threads to finish their decoding.

In some embodiments of the present invention which may accommodate an existing standard or method, an entropy slice may share most of the slice attributes of a regular slice according to the standard or method. Therefore, an entropy slice may require a small header. In some embodiments of the present invention, the entropy slice header may allow a decoder to identify the start of an entropy slice and start entropy decoding. In some embodiments, at the start of a picture, or a reconstruction slice, the entropy slice header may be the regular header, or a reconstruction slice header.

In some embodiments of the present invention comprising an H.264/AVC codec, an entropy slice may be signaled by adding a new bit, "entropy-slice-flag" to the existing slice header. Table 1 lists the syntax for an entropy slice header according to embodiments of the present invention, wherein C indicates Category and Descriptor u(1), ue(v) indicate some fixed length or variable length coding methods.

"first_mb_in_slice" specifies the address of the first macroblock in the entropy slice associated with the entropy-slice header. In some embodiments, the entropy slice may comprise a sequence of macroblocks.

"cabac_init_idc" specifies the index for determining the initialization table used in the initialization process for the context mode.

TABLE 1

Syntax Table for Entropy Slice Header

| slice_header( ) { | C | Descriptor |
|---|---|---|
| entropy_slice_flag | 2 | u(1) |
| if (entropy_slice_flag) { | | |
| first_mb_in_slice | 2 | ue(v) |
| if (entropy_coding_mode_flag && slice_type != I && slice_type != SI) | | |

TABLE 1-continued

Syntax Table for Entropy Slice Header

| slice_header( ) { | C | Descriptor |
|---|---|---|
| cabac_init_idc | 2 | ue(v) |
| } | | |
| } | | |
| else { | | |
| a regular slice header ... | | |
| } | | |
| } | | |

In some embodiments of the present invention, an entropy slice may be assigned a different network abstraction layer (NAL) unit type from the regular slices. In these embodiments, a decoder may distinguish between regular slices and entropy slices based on the NAL unit type. In these embodiments, the bit field "entropy-slice-flag" is not required.

In some embodiments of the present invention, an entropy slice may be constructed by altering the data multiplexing. In some embodiments of the present invention, the group of symbols contained in an entropy slice may be multiplexed at the macroblock level. In alternative embodiments of the present invention, the group of symbols contained in an entropy slice may be multiplexed at the picture level. In other alternative embodiments of the present invention, the group of symbols contained in an entropy slice may be multiplexed by data type. In yet alternative embodiments of the present invention, the group of symbols contained in an entropy slice may be multiplexed in a combination of the above.

Figure 8:
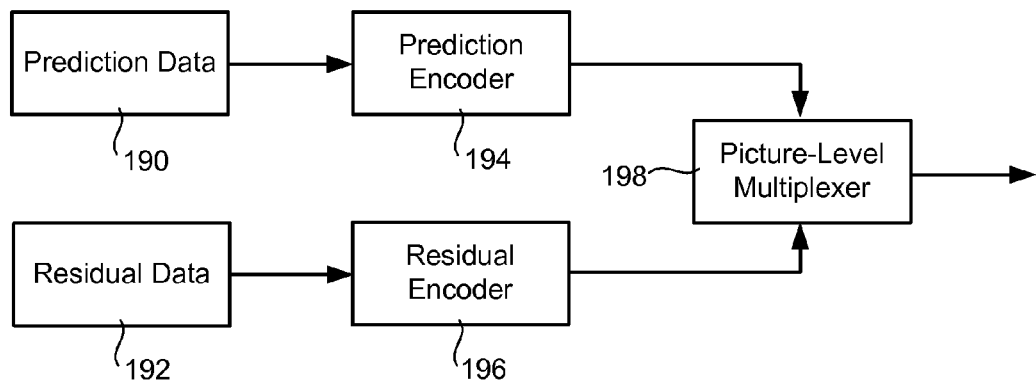
FIG. 8 is a chart showing an exemplary embodiment of the present invention comprising prediction data/residual data multiplexing at the picture level for entropy slice construction.
Figure 9:
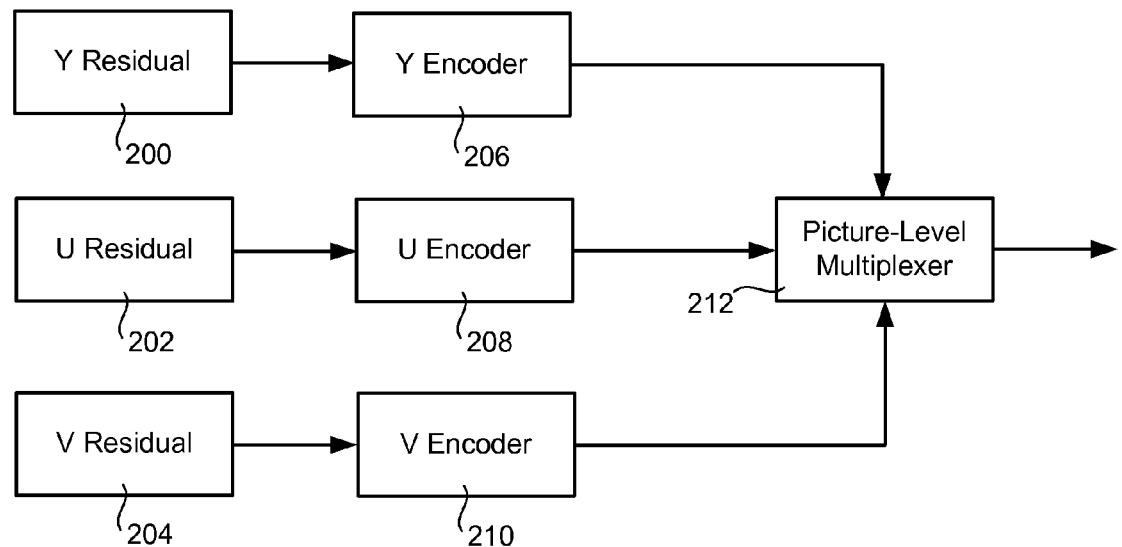
FIG. 9 is a chart showing an exemplary embodiment of the present invention comprising color-plane multiplexing at the picture level for entropy slice construction.

Some embodiments of the present invention comprising entropy slice construction based on picture level multiplexing may be understood in relation to FIG. 8 and FIG. 9. In some embodiments of the present invention shown in FIG. 8, prediction data 190 and residual data 192 may be entropy encoded 194, 196 separately and multiplexed 198 at the picture level. In some embodiments of the present invention, the prediction data for a picture 190 may be associated with a first entropy slice, and the residual data for a picture 192 may be associated with a second entropy slice. The encoded prediction data and the encoded entropy data may be decoded in parallel. In some embodiments of the present invention, each partition comprising prediction data or residual data may be partitioned into entropy slices which may be decoded in parallel.

In some embodiments of the present invention shown in FIG. 9, the residual of each color plane, for example, the luma residual 200 and the two chroma residuals 202, 204, may be entropy encoded 206, 208, 210 separately and multiplexed 212 at the picture level. In some embodiments of the present invention, the luma residual for a picture 200 may be associated with a first entropy slice, the first chroma residual for a picture 202 may be associated with a second entropy slice, and the second residual for a picture 204 may be associated with a third entropy slice. The encoded residual data for the three color planes may be decoded in parallel. In some embodiments of the present invention, each partition comprising color-plane residual data may be partitioned into entropy slices which may be decoded in parallel. In some embodiments of the present invention, the luma residual 200 may have relatively more entropy slices compared to the chroma residuals 202, 204.

Figure 10:
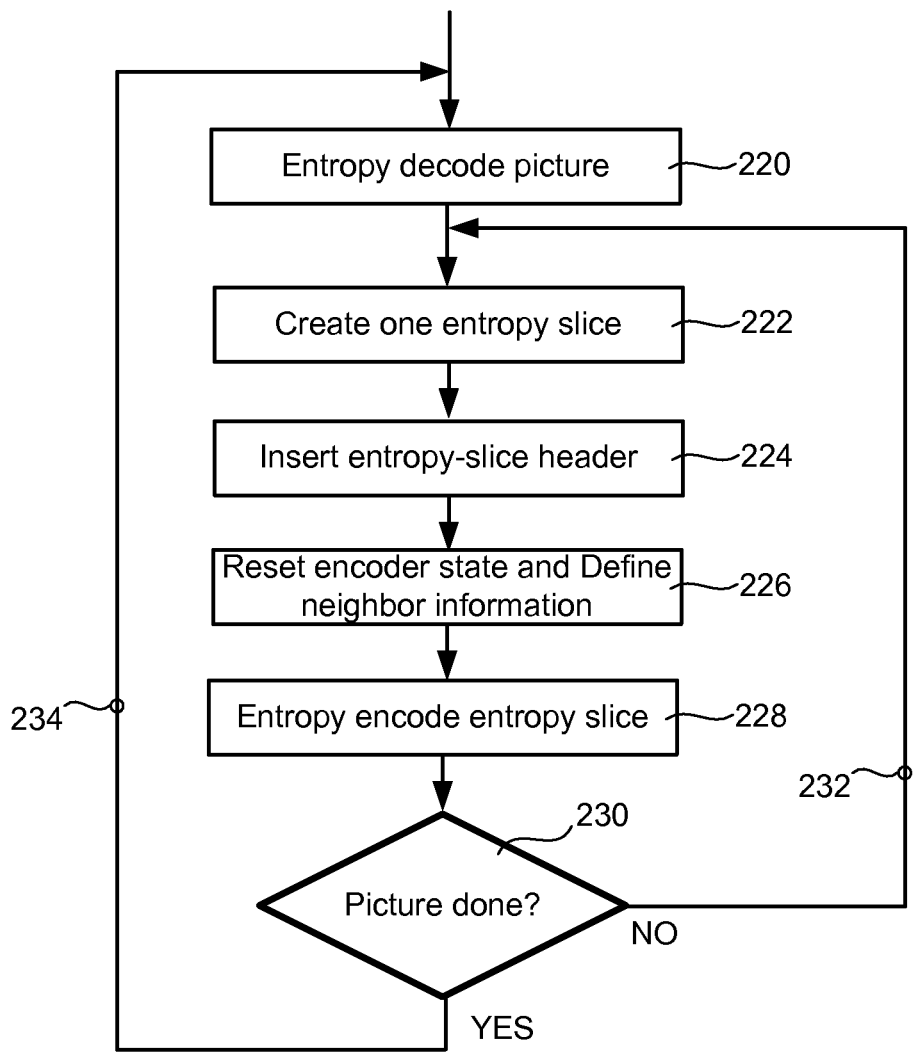
FIG. 10 is a chart showing an exemplary embodiment of the present invention comprising transcoding a bitstream by entropy decoding, forming entropy slices and entropy encoding.

In some embodiments of the present invention, an compressed-video bitstream may be transcoded to comprise entropy slices, thereby allowing for parallel entropy decoding as accommodated by embodiments of the present invention described above. Some embodiments of the present invention may be described in relation to FIG. 10. An input bitstream without entropy slices may be processed picture-by-picture according to FIG. 10. In these embodiments of the present invention, a picture from the input bitstream may be entropy decoded 220. The data which had been coded, for example, mode data, motion information, residual information and other data, may be obtained. Entropy slices may be constructed 222 one at a time from the data. An entropy-slice header corresponding to an entropy slice may be inserted 224 in a new bitstream. The encoder state may be reset and the neighbor information defined 226. The entropy slice may be entropy encoded 228 and written to the new bitstream. If there is picture data that has not been consumed 232 by the constructed entropy slices, then another entropy slice may be constructed 222, and the process 224-230 may continue until all of the picture data has been consumed 234 by the constructed entropy slices, and then the next picture may be processed.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for decoding a video bitstream, said method comprising:
   entropy decoding a first portion of a video bitstream, wherein said first portion of said video bitstream is associated with a video frame and, wherein said first portion is further associated with a reconstruction slice and a first entropy slice, wherein said first entropy slice comprises a first plurality of macroblocks in said reconstruction slice, thereby producing a first portion of decoded data;
   entropy decoding a second portion of said video bitstream, wherein said second portion of said video bitstream is associated with said video frame and, wherein said second portion is further associated with said reconstruction slice and a second entropy slice, wherein said second entropy slice comprises a second plurality of macroblocks in said reconstruction slice, wherein said second plurality of macroblocks does not contain any macroblock from said first plurality of macroblocks, thereby producing a second portion of decoded data, wherein said entropy decoding said second portion of said video bitstream is independent of said entropy decoding said first portion of said video bitstream; and
   reconstructing a first portion of said video frame associated with said reconstruction slice using said first portion of decoded data and said second portion of decoded data.

2. A method as described in claim 1, wherein said first portion of decoded data and said second portion of decoded data are picture-level multiplexed data, said method further comprising:
   de-multiplexing said first portion of decoded data; and
   de-multiplexing said second portion of decoded data.

3. A method as described in claim 1, wherein said video bitstream comprises a first flag for indicating whether or not said video bitstream comprises a plurality of entropy slices.

4. A method as described in claim 1, wherein:
   said entropy decoding said first portion of said video bitstream comprises:
      initializing a first plurality of context models; and
      updating said first plurality of context models during said entropy decoding said first portion of said video bitstream; and
   said entropy decoding said second portion of said video bitstream comprises:
      initializing a second plurality of context models; and
      updating said second plurality of context models during said entropy decoding said second portion of said video bitstream.

5. A method as described in claim 1 further comprising parsing said video bitstream to identify said first portion of said video bitstream and said second portion of said video bitstream.

6. A method as described in claim 5, wherein said first portion of said video bitstream is identified by a first header.

7. A method as described in claim 1, wherein said reconstructing said first portion of said video frame comprises:
   generating a first reconstructed macroblock using said first portion of decoded data; and
   generating a second reconstructed macroblock using said first reconstructed macroblock and said second portion of decoded data.

8. A method for decoding a video frame in a video sequence, said method comprising:
   receiving a bitstream;
   identifying a reconstruction slice in said bitstream;
   identifying a plurality of entropy slices associated with said reconstruction slice in said bitstream, wherein each entropy slice, in said plurality of entropy slices, comprises a plurality of macroblocks in said reconstruction slice, wherein no macroblock in said reconstruction slice is in two entropy slices in said plurality of entropy slices and wherein entropy decoding a first entropy slice in said plurality of entropy slices does not depend on any of said remaining entropy slices in said plurality of entropy slices;
   entropy decoding each of said plurality of entropy slices associated with said reconstruction slice, thereby producing a plurality of entropy-decoded entropy slices; and
   reconstructing a portion of a video frame associated with said reconstruction slice using said plurality of entropy-decoded entropy slices.

9. A method as described in claim 8, wherein said reconstruction slice corresponds to the entirety of said video frame.

10. A method as described in claim 8, wherein entropy decoding a first entropy slice in said plurality of entropy slices associated with said reconstruction slice comprises:
    initializing a plurality of context models; and
    updating said plurality of context models during said entropy decoding said first entropy slice in said plurality of entropy slices associated with said reconstruction slice.

11. A method as described in claim 10, wherein said first entropy slice is identified by a first header.

12. A method as described in claim 8 wherein said identifying said plurality of entropy slices associated with said reconstruction slice comprises parsing said bitstream to identify each entropy slice in said plurality of entropy slices associated with said reconstruction slice.

13. A method as described in claim 8, wherein said reconstructing said portion of said video frame associated with said reconstruction slice comprises:
    generating a first reconstructed macroblock using a first entropy-decoded entropy slice from said plurality of entropy-decoded entropy slices; and
    generating a second reconstructed macroblock using said first reconstructed macroblock and a second entropy-decoded entropy slice from said plurality of entropy-decoded entropy slices.

14. A method for encoding a video frame in a video sequence, said method comprising:
  partitioning a first frame in a video sequence into at least one reconstruction slice, thereby producing a first reconstruction slice associated with a first area of said first frame, wherein reconstruction of said first area does not require any reconstruction slice other than said first reconstruction slice; and
  partitioning said first reconstruction slice into a plurality of entropy slices, wherein each entropy slice, in said plurality of entropy slices, comprises a plurality of macroblocks in said first reconstruction slice, wherein no macroblock in said first reconstruction slice is in two entropy slices in said plurality of entropy slices and wherein entropy coding of a first entropy slice, in said plurality of entropy slices, is independent of entropy coding of any other entropy slice, in said plurality of entropy slices.

15. A method as described in claim 14, wherein:
  said first entropy slice in said plurality of entropy slices is associated with a luma-component residual data for said first frame;
  a second entropy slice in said plurality of entropy slices is associated with a first-chroma-component residual data for said first frame; and
  a third entropy slice in said plurality of entropy slices is associated with a second-chroma-component residual data for said first frame.

16. A method as described in claim 14, wherein:
  said first plurality of entropy slices in said plurality of entropy slices is associated with a luma-component residual data for said first frame;
  a second plurality of entropy slices in said plurality of entropy slices is associated with a first-chroma-component residual data for said first frame; and
  a third plurality of entropy slices in said plurality of entropy slices is associated with a second-chroma-component residual data for said first frame.

17. A method as described in claim 14 further comprising, for said first entropy slice in said plurality of entropy slices and a remaining plurality of entropy slices comprising all entropy slices in said plurality of entropy slices other than said first entropy slice, marking all data in said remaining plurality of entropy slices as unavailable for neighborhood availability for entropy decoding a block in said first entropy slice.

18. A method as described in claim 14 further comprising associating an entropy-slice header with each of said plurality of entropy slices.

19. A method as described in claim 14 further comprising associating an entropy-slice flag with a bitstream generated using said plurality of entropy slices.

20. A method for generating a video bitstream for parallel decoding, said method comprising:
  receiving a first video bitstream;
  identifying a reconstruction slice in said video bitstream;
  entropy decoding a plurality of symbols from said reconstruction slice, thereby producing entropy-decoded data associated with said reconstruction slice;
  partitioning said entropy-decoded data associated with said reconstruction slice into a plurality of entropy slices associated with said reconstruction slice, wherein each entropy slice, in said plurality of entropy slices, comprises a plurality of macroblocks in said reconstruction slice, wherein no macroblock in said reconstruction slice is in two entropy slices in said plurality of entropy slices;
  independently entropy encoding the entropy-decoded data of each entropy slice of said plurality of entropy slices, thereby producing a plurality of entropy-encoded entropy slices; and
  generating a second video bitstream comprising said plurality of entropy-encoded entropy slices.

21. A method as described in claim 20 further comprising associating a header with each entropy-encoded entropy slice in said plurality of entropy-encoded entropy slices.

22. A method as described in claim 20 further comprising associating an entropy-slice flag with said second video bitstream.

23. A method as described in claim 20 further comprising de-multiplexing said entropy-decoded data associated with said reconstruction slice, wherein said entropy-decoded data associated with said reconstruction slice is picture-level multiplexed data.

24. A method as described in claim 20, wherein independently entropy encoding the entropy-decoded data of each of said plurality of entropy slices comprises for each entropy slice:
  initializing a plurality of context models; and
  updating said plurality of context models during said entropy encoding.

* * * * *